United States Patent
Nelson et al.

(10) Patent No.: US 7,414,013 B2
(45) Date of Patent: Aug. 19, 2008

(54) SULFURIZED POLYISOBUTYLENE BASED WEAR AND OXIDATION INHIBITORS

(75) Inventors: Kenneth D. Nelson, Clearlake, CA (US); Frank Plavac, Mill Valley, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 294 days.

(21) Appl. No.: 10/997,610

(22) Filed: Nov. 23, 2004

(65) Prior Publication Data

US 2005/0153850 A1  Jul. 14, 2005

Related U.S. Application Data

(62) Division of application No. 10/355,539, filed on Jan. 30, 2003, now Pat. No. 6,884,855.

(51) Int. Cl.
*C10M 135/34* (2006.01)

(52) U.S. Cl. .................. 508/300; 508/302; 508/308

(58) Field of Classification Search .......... 508/300, 508/302, 308
See application file for complete search history.

(56) References Cited

U.S. PATENT DOCUMENTS

| | | | |
|---|---|---|---|
| 2,337,473 A | 12/1943 | Knowles et al. | |
| 2,535,705 A | 12/1950 | Stevens et al. | |
| 2,535,706 A | 12/1950 | Stevens et al. | |
| 2,658,900 A * | 11/1953 | Camp et al. | 549/36 |
| 2,995,569 A | 8/1961 | Hamilton et al. | |
| 3,345,380 A | 10/1967 | Hodgson | |
| 3,364,232 A * | 1/1968 | Anderson | 549/36 |
| 3,427,246 A * | 2/1969 | Anderson | 508/227 |
| 3,697,221 A | 10/1972 | Redmore et al. | |
| 3,703,504 A | 11/1972 | Horodysky | |
| 3,703,505 A | 11/1972 | Horodysky et al. | |
| 3,753,908 A | 8/1973 | de Vries et al. | |
| 3,796,661 A | 3/1974 | Suratwala et al. | |
| 3,873,454 A | 3/1975 | Horodysky | |
| 4,042,514 A | 8/1977 | Giolito et al. | |
| 4,119,549 A | 10/1978 | Davis | |
| 4,119,550 A | 10/1978 | Davis et al. | |
| 4,147,640 A | 4/1979 | Jayne et al. | |
| 4,191,659 A | 3/1980 | Davis | |
| 4,194,980 A | 3/1980 | Braid | |
| 4,240,958 A | 12/1980 | Braid | |
| 4,344,854 A | 8/1982 | Davis et al. | |
| 5,135,670 A | 8/1992 | Johnson et al. | |
| 5,338,468 A | 8/1994 | Arvizzigno et al. | |
| 5,368,758 A | 11/1994 | Gapinski | |
| 5,448,000 A | 9/1995 | Gullapalli et al. | |
| 5,498,809 A * | 3/1996 | Emert et al. | 585/13 |
| 5,652,201 A * | 7/1997 | Papay et al. | 508/228 |
| 5,849,677 A | 12/1998 | Romanelli | |
| 6,355,839 B1 | 3/2002 | Onopchenko | |

FOREIGN PATENT DOCUMENTS

| | | |
|---|---|---|
| EP | 0 201 197 B1 | 7/1990 |
| EP | 0 342 792 B1 | 3/1993 |
| GB | 1 162 443 | 8/1969 |
| GB | 2 016 479 A | 9/1979 |
| WO | WO 01/70830 A2 | 9/2001 |

OTHER PUBLICATIONS

Landis, P. S., and Hamilton, L.A., J. Org. Chem, 1960, 25, 1742-1744.*
Noel Lozac'h et al., The Chemistry of the 1,2-Dithiole Ring, The Chemistry of Organic Sulfur Compounds, (1966), pp. 257-285, vol. 2, Chapter 10, Symposium Publications Division, Pergamon Press, Oxford.
L. Bateman et al., Reactions of Sulfur with Olefins, Organic Sulfur Compounds, (1961) pp. 210-228, vol. 1, Chapter 20, Symposium Publications Division, Pergamon Press, Oxford.
A. S. Brown et al., Research on the Reaction of Sulfur with Unsaturated Compounds v. Action of Sulfur on Monounsaturated Aliphatic Hydrocarbons, (1950), pp. 764-776, J. Gen. Chem., USSR 20.
Phillip S. Landis, The Chemistry of 1,2-dithiole-3-thiones, (1965), pp. 237-245, Chem. Rev. 65(2).
Phillip S. Landis et al., Synthesis and Reactions of 4-neopentyl-5-tert-butyl-1,2-dithiole-3-thione, (1960), pp. 1742-1744, vol. 25, J. Org. Chem.
Roderick S. Spindt et al., Some New Alkyl 1,2-dithia-4-cyclopentene-3-thiones, (Aug. 1951), pp. 3693-3697, vol. 73, J. Am. Chem. Soc.

* cited by examiner

*Primary Examiner*—Glenn Calddarola
*Assistant Examiner*—Jim Goloboy
(74) *Attorney, Agent, or Firm*—Joseph P. Foley; Claude J. Caroli

(57) ABSTRACT

Sulfurized olefin compositions and compounds of the formula:

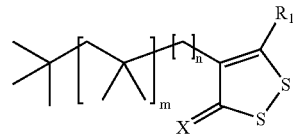

wherein $R_1$ is hydrogen or methyl; X is sulfur or oxygen; m is an integer from 1 to 9; and n is 0 or 1, and when n is 0 then $R_1$ is methyl, and when n is 1 then $R_1$ is hydrogen are disclosed. The resulting compounds are particularly the polyisobutyl-1,2-dithiole-4-cyclopentene-3-thione compounds and derivatives are useful in lubricating oils.

17 Claims, No Drawings

SULFURIZED POLYISOBUTYLENE BASED WEAR AND OXIDATION INHIBITORS

FIELD OF THE INVENTION

This invention is directed in part to sulfurized olefin compositions and components prepared by sulfurizing polyisobutylene(s) containing a high concentration of the methyl vinylidene isomer (highly reactive polyisobutene, HR PIB), at suitable temperatures and to the resulting reaction products, including the polyisobutyl-1,2-dithiole-4-cyclopentene-3-thione compounds and derivatives thereof. This invention also discloses of the process to prepare the sulfurized polyisobutyl reaction products, the use of such compounds, and lubricant compositions containing them as well as enriched compositions containing polyisobutyl-1,2-dithiole-4-cyclopentene-3-thione compounds and derivatives.

BACKGROUND OF THE INVENTION

Sulfurized olefins, e.g. sulfurized isobutylene and lubricant compositions containing such sulfurized isobutylene, are well known in the art as lubricant additives imparting extreme pressure and antiwear capabilities.

The metal surfaces of machinery or engines operating under heavy loads, wherein metal slides against metal, may undergo excessive wear or corrosion. Often the lubricants used to protect the metal surfaces deteriorate under such heavy loads and as a result, do not prevent wear at the points of metal to metal contact. Consequently, the performance of the machine or engine will suffer, and in aggravated cases the machine or engine may become completely inoperative. While sulfurized olefins have shown some benefit when added as lubricant additive, in many instances their application is limited since some types of sulfurized olefins have: an undesirable corrosion property (especially towards copper), generate malodorous by-products in operation, and/or have stability and compatibility issues.

Sulfurized olefins have been extensively used in many lubricant applications requiring extreme pressure/antiwear activity. These sulfurized olefins which include sulfurized $C_3$-$C_8$ olefins such as isobutylene are described by U.S. Pat. Nos. 3,703,504; 3,703,505; and 3,873,454. These patents and U.S. Pat. No. 4,240,958 generally employ methods of preparing their sulfurized products wherein the olefin is sulfohalogenated with a sulfur halide at some stage in their synthesis.

Sulfurized olefins have also been prepared by the direct sulfurization of olefins with sulfur and hydrogen sulfide, see U.S. Pat. Nos. 2,337,473; 4,119,549; 4,119,550; 4,191,659; 4,344,854 and 4,147,640. U.S. Pat. No. 4,147,640, for example, describes the sulfurization of various olefinic hydrocarbons such as dicyclopentadiene with sulfur and hydrogen sulfide. Also disclosed are methods of preparing sulfurized compounds by contacting an olefinic feedstock with sulfur and hydrogen. The olefin can be isobutene and the catalyst can be ammonia or an amine, typically these products are alkyl-alkenyl polysulfide mixtures and polymeric polysulfides.

The direct sulfurization of olefins such as diisobutylene and triisobutylene with sulfur is described, for example, in U.S. Pat. Nos. 2,995,569 and 3,796,661. When triisobutylene is employed, these patents describe the formation of exclusively 4-neopentyl-5-tertiary butyl-1,2-dithiole-4-cyclopentene-3-thione with a minor amount of organic sulfides and polysulfides. The direct sulfurization process employed elevated temperatures at both low and elevated pressures.

U.S. Pat. No. 3,697,221 discloses of several 1,2-dithiole-3-thione derivatives as intermediates to the thionium methosulfates. U.S. Pat. No. 4,042,514 discloses of alkylthio and alkylarylthio derivatives of 1,2-dithiole-3-thiones. U.S. Pat. No. 4,194,980 discloses cyclic sulfurized olefins prepared by reacting an olefin with a cyclic polydisulfide. U.S. Pat. Nos. 3,345,380, 2,535,706, 2,535,705 describe methods of making various thiones by reacting elemental sulfur and isobutylene and other unsaturated hydrocarbons. U.S. Pat. No. 3,364,232 discloses high molecular weight trithiones prepared by reacting an olefin of at least 30 carbons in the presence of sulfur and a substituted trithione.

Thus, it is well known that many methods have been used for producing organic sulfides by treating olefins. It is also well known that many sulfurized organic compositions are useful as lubricant additives. Some of the prior art teaches that thiones are undesirable especially high levels of thiones, such as dithiol-thiones (or dithiolethiones), or high levels of thiones in combination with various complex sulfurized mixtures. Typically these thiones need to be removed. Dithiolethione-free sulfurized olefin compositions have been prepared by the reaction of sulfur, isobutylene and hydrogen sulfide as exemplified by U.S. Pat. No. 4,344,854 noted above, or U.S. Pat. No. 5,135,670 also employing a sodium sulfate nonahydrate, and for example U.S. Pat. No. 5,338,468 employing elemental sulfur, isobutylene and an amine base. U.S. Pat. No. 5,849,677 discloses extraction of 4-methyl-3H-1,2-dithiole-3-thione ("MDTT") from a sulfurized olefin feed stream using solvent extraction.

It has now been discovered that the reaction of sulfur and a highly reactive methylvinylidene polyisobutylene produces a low odor, sulfurized polyisobutylene reaction product having anti-wear, extreme pressure load capacity, and antioxidant characteristics; which is suitable for use, for example, as a lubricant additive. Such reaction product and resulting polyisobutyl-1,2-dithiole-4-cyclopentene-3-thiones reaction products are thermally more stable relative to the conventional sulfurized isobutylene, do not have a strong odor, and are anticipated to be more stable in the presence of acids. Accordingly, there is a need for methods to prepare and use these reaction products, to the components themselves as well as mixtures thereof, and to compositions employing them.

SUMMARY OF THE INVENTION

This invention relates to sulfurized olefin compositions prepared from sulfurizing high methylvinylidene polyisobutylene(s) "HR PIB" at suitable reaction temperatures and to the resulting sulfurized product and resulting polyisobutyl-1,2-dithiole-4-cyclopentene-3-thione compounds "PDCT" produced therefrom, including the use of such compounds and/or compositions, and lubricant compositions containing them as well as derivatives thereof. More specifically, the compositions and compounds of the present invention are prepared by sulfurization of a highly reactive polyisobutylene having at least 25% of a methylvinylidene isomer and wherein the polyisobutylene has a number average molecular weight in the range of about 120 to about 600 with a sulfur source at a reaction temperature in excess of about 175° C. Accordingly, a process for preparing a sulfurized olefin composition comprising reacting polyisobutylene having at least 25% of a methylvinylidene isomer and wherein the polyisobutylene has a number average molecular weight in the range of about 120 to about 600 with a sulfur source at a reaction temperature in excess of about 175° C. is disclosed. In either event, a preferred polyisobutylene having a 2-methylvinylidene content in the amount of at least 25% with an average molecular weight in the range of 120 to 600. One such suitable polyisobutylene feedstream is generated as by-product in typical commercial highly reactive polyisobutylene production, which heretofore had little economic value.

In a preferred embodiment, the polyisobutylene moiety is selected from a mixture of $C_8H_{16}$ to $C_{32}H_{64}$ oligomers. And even more preferred, the polyisobutylene comprises about 5 wt. % to about 20 wt. % $C_8H_{16}$, about 35 wt. % to about 55 wt. % $C_{12}H_{24}$, about 20 wt. % to about 30 wt. % $C_{16}H_{32}$, about 8 wt. % to about 15 wt. % $C_{20}H_{40}$, about 2 wt. % to about 8 wt. % $C_{24}H_{48}$, and about 0.5 wt. % to about 2 wt. % $C_{28}H_{56}$ and less than 2 wt % $C_{32}H_{64}$.

As is frequently the case with olefin sulfurization products, the reaction product is typically a mixture of products because of competing or sequential reactions which can result in secondary or derivative products, such as dialky, cyclic and the polyisobutyl-1,2-dithiole-4-cyclopentene-3-thione compounds, of which the latter are produced in a major amount. In general a commercial product will be a mixture of sulfurized compounds since often there is little benefit to isolate the individual compounds. However, it has been shown in some applications further purified polyisobutyl-1,2-dithiole-4-cyclopentene-3-thione compounds demonstrate improved results when employed in lubricating compositions. Accordingly this invention is directed to the resulting polyisobutyl-1,2-dithiole-4-cyclopentene-3-thione compound(s) and mixtures thereof. Especially preferred are the various polyisobutyl-1,2-dithiole-4-cyclopentene-3-thione isomers formed.

The principal sulfurization product and derivative thereof, referred to herein as polyisobutyl-1,2-dithiole-4-cyclopentene-3-thione, can be represented by the formula:

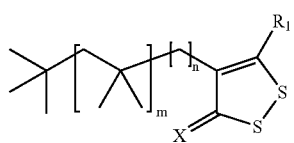

FORMULA I wherein $R_1$ is hydrogen or methyl; X is sulfur or oxygen; m is an integer from 1 to 9; and n is 0 or 1, with the condition that when n is 0 then $R_1$ is methyl, and when n is 1 then $R_1$ is hydrogen. Preferably X is sulfur and in one aspect, $R_1$ is methyl and in another, $R_1$ is hydrogen. Preferably m is an integer from 1 to 6 and even more preferably from 1 to 5. In another aspect, m is greater than one and preferably an integer from 2 to 5.

The present invention further provides lubricating composition(s) that are thermally stable, resistant to acid attack and are useful as extreme pressure (EP) and/or antiwear agents and/or antioxidants in lubricants, functional fluids, and normally liquid fuels. The sulfurized high methylvinylidene polyisobutylene product and resulting polyisobutyl-1,2-dithiole-4-cyclopentene-3-thione compounds are particularly suited for engine and gear lubricants and accordingly one aspect is directed to lubricating compositions comprising an oil of lubricating viscosity and one or more of the polyisobutyl-1,2-dithiole-4-cyclopentene-3-thione compounds of this invention. These lubricating compositions can be further formulated with additional additives, such as dispersants, detergents, oil soluble phosphorous containing compounds selected from extreme pressure agents and antiwear agents, and alkali-metal borates. Accordingly, lubricating compositions can be initially formulation with the polyisobutyl-1,2-dithiole-4-cyclopentene-3-thione compounds of this invention or top treated with an amount suitable for EP, antiwear or antioxidant property desired.

DETAILED DESCRIPTION OF THE INVENTION

The present invention relates to the preparation of sulfurized olefins and other polyisobutyl-1,2-dithiole-4-cyclopentene-3-thione compositions using a low molecular weight highly reactive polyisobutylenes as the olefin reagent. Highly reactive polyisobutylenes (HR PIB) are valued for use in the lubricating oil additive industry and are commercially produced in the chemical industry. These valued HR PIB polymers are characterized by the presence of significant amounts of 2-methylvinylidene isomers, $RC(CH_3)\!=\!CH_2$ where R is a polyisobutyl residue, and a molecular weight preferably in the range of about 500 to 5000. In addition to valued high molecular weight products, there exists an under utilized low molecular weight HR PIB distillate generally regarded as a waste product. Such methylvinylidene polyisobutylenes are typically prepared using boron trifluoride catalysis. The preparation of such polyisobutylenes in which the methylvinylidene isomer comprises a high percentage of the total olefin composition is described in U.S. Pat. Nos. 4,152,499 and 4,605,808, the disclosures of which are incorporated herein by reference.

This invention is directed to compounds and compositions prepared by sulfurization of a highly reactive polyisobutylene having at least 25% of a methylvinylidene isomer and wherein the polyisobutylene has a number average molecular weight in the range of about 120 to about 600 with a sulfur source at a reaction temperature in excess of about 175° C. One aspect of this invention is directed to low molecular weight polyisobutyl-1,2-dithiole-4-cyclopentene-3-thione compositions, compounds and derivatives represented by the formula I:

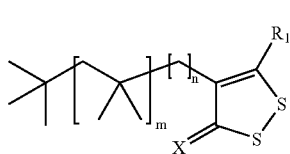

FORMULA I wherein $R_1$ is hydrogen or methyl; X is sulfur or oxygen; m is an integer from 1 to 9; and n is 0 or 1, with the condition that when n is 0 then $R_1$ is methyl, and when n is 1 then $R_1$ is hydrogen. Preferably X is sulfur and in one aspect, $R_1$ is methyl and in another, $R_1$ is hydrogen. Preferably, m is an integer from 1 to 6, more preferably 1 to and more preferably 2 to 5. In another aspect, m is greater than one. Compounds of Formula I have also been referred to in the art as pseudo-aromatic sulfur compounds, thiones, dithiol-thiones, trithiones, as well as 1,2-dithiole-3-thiones. However, as used herein such compounds are referred to as 1,2-dithiole-4-cyclopentene-3-thiones and more specifically as polyisobutyl-1,2-dithiole-4-cyclopentene-3-thiones, since they are polyisobutyl substituted.

The compositions can also be prepared using a single polyisobutylene oligomer fraction such as tri-isobutylene, tetra-isobutylene, penta-isobutylene, hexa-isobutylene or hepta-isobutylene; these fractions may contain various polyisobutene isomers including at least 25% of the methyl vinylidene isomer. These compositions can be further purified to specific isomer compounds using separation techniques known in the art for example, distillation, solvent refining, crystallization, and the like.

Highly Reactive Polyisobutylene

It is generally known by those skilled in the art that the commercial HR PIB production process described above generates a HR PIB distillate byproduct that; (i) contains mostly $C_8H_{16}$ to $C_{28}H_{56}$ oligomers (average $C_{14}H_{28}$), (ii) exhibits a relatively low average molecular weight of about 200 and, (iii) contains 2-methylvinylidene in the amount of at least about 25%. This low molecular weight distillate byproduct, which amounts to several percent of total HR PIB production, has little value and is typically sold as a fuel product. Thus, a need exists in the chemical industry to develop a valuable use for the HR PIB distillate byproduct. The present invention fulfills this need by providing a process for preparation of sulfurized olefins and other polyisobutyl-1,2-dithiole-4-cyclopentene-3-thione compositions and derivatives thereof, preferably employing the HR PIB distillate byproduct, or fractions thereof.

For purposes of this invention, the term "polyisobutylene" refers to a HR PIB containing at least about 25% of a 2-methylvinylidene isomer and is further defined as comprising a mixture of highly reactive polyisobutylene oligomers. In a preferred embodiment, said mixture contains mostly $C_8H_{16}$ to $C_{28}H_{56}$ oligomers and may contain fractional amounts of $C_{32}H_{62}$ oligomers (average $C_{14}H_{28}$), exhibiting an average molecular weight in the range of about 120 to about 600, preferably in the range of 150 to about 400, and more preferably in the range of about 160 to about 280 (an average of about 200). Such HR PIB useful in this invention may employ the HR PIB distillate byproduct. The olefinic bonds of a preferred low molecular weight HR PIB comprise at least about 25% methylvinylidene content, preferably in the range of about 25% to about 95%, more preferably about 40% to about 95%, and even more preferably about 60% to about 90% methylvinylidene isomer. Diisobutylene ($C_8H_{16}$) may be present in a fractional amounts from 0% to less than 50% based upon weight of HR PIB.

Preferred low molecular weight HR PIBs comprise less than about 32 carbon atoms, for example, one or more of: 32 carbon atoms, 28 carbon atoms, 24 carbon atoms, 20 carbon atoms, 16 carbon atoms, 12 carbon atoms, and 8 carbon atoms. More preferred low molecular weight HR PIBs comprise from about 8 to about 28 carbon atoms. Most preferred low molecular weight HR PIBs comprise from about 12 to about 28 carbon atoms. Preferred low molecular weight HR PIBs have a molecular weight of about 448 or less. More preferred low molecular weight HR PIBs have a molecular weight of about 120 to about 392. Most preferred low molecular weight HR PIB has a molecular weight of about 168 to about 392.

The HR PIBs of this invention may be mixtures of individual low molecular weight polyisobutylene components of varying molecular weights. A mixture of low molecular weight HR PIBs might comprise any or all of $C_8$, $C_{12}$, $C_{16}$, $C_{20}$, $C_{24}$, $C_{28}$ and $C_{32}$ molecules. One embodiment of this invention may comprise the use of low molecular weight HR PIB molecules that have been separated according to carbon number. For example, a HR PIB mixture may be distilled to provide compositions that comprise one or more of $C_8$, $C_{12}$, $C_{16}$, $C_{20}$, $C_{24}$, $C_{28}$, or $C_{32}$ molecules, with the proviso that when diisobutylene is employed it is maintained in a fractional amount. Preferred low molecular weight HR PIBs of this invention are those that are used as a mixture of varying molecular weights. A preferred low molecular weight HR PIB mixture may have the number average molecular weight ($M_n$) of about 150 to about 240 and more preferably from about 175 to about 225.

A preferred low molecular weight HR PIB mixture may comprise the following: about 5 wt. % to about 20 wt. % $C_8H_{16}$, about 35 wt. % to about 55 wt. % $C_{12}H_{24}$, about 20 wt. % to about 30 wt. % $C_{16}H_{32}$, about 8 wt. % to about 15 wt. % $C_{20}H_{40}$, about 2 wt. % to about 8 wt. % $C_{24}H_{48}$, and about 0.5 wt. % to about 2 wt. % $C_{28}H_{56}$. $C_{32}H_{64}$ and higher species may comprise about 2 wt. % or less of the total. In a more preferred embodiment, the $C_8H_{16}$ are removed from the above mixture with the remaining weight percents adjusted accordingly. Preferably, the mixtures contains a high methylvinylidene content of from about 50 to 95% or more and more preferably from about 60-85% methylvinylidene and having a $M_n$ of from about 175 to about 225.

There are several advantages to using the presently employed polyisobutylene oligomers to prepare sulfurized products including the polyisobutyl-1,2-dithiole-4-cyclopentene-3-thione and derivatives thereof; for example: (1) the sulfurization reaction can be carried out at elevated temperatures under low pressure; (2) flexibility in utilizing a new, previously under utilized feedstock, which can be comprised of specific carbon number fractions, a mixture of selected fractions or, most desirably, use of the total, unfractionated HR PIB distillate byproduct, with or without removal of inert solvent (2% to 10%); (3) the sulfurization reaction can be carried out at relatively lower temperatures, which because of the greater reactivity afforded by the presence of 2-methylvinylidene results in a liquid product and no solid product under reaction conditions as is usual in low temperature reactions with conventional diisobutylene, and; (4) milder, low temperature reaction conditions can be employed to control fragmentation.

Sulfur

Any suitable sulfur source can be used for the sulfurization of the HR PIB. Elemental sulfur, hydrogen sulfide, sulfur dioxide, sodium sulfide hydrates are well known and are commercially available. Preferably elemental sulfur is used and which can be heated to the molten state to hasten the reaction kinetics and minimize the formation of mono- and polysulfides, dithiole derivatives including mercapto components; although the latter of which can be further decomposed into the polyisobutyl-1,2-dithiole-4-cyclopentene-3-thione compositions of the present invention.

The amounts of sulfur per mole of HR PIB compound are, respectively, about 1.0-3.5 gram-atoms and about 0.1-1.5 moles. The preferred ranges are about 2.0-3.1 gram-atoms and about 0.4-1.25 moles respectively, and the most desirable ranges are about 2.5-3.0 gram-atoms and about 0.8-1.0 mole respectively. In batch operations, the reactants are introduced at levels to provide these ranges. In semi-continuous and continuous operations, they may be admixed at any ratio but on a mass balance basis, they are present so as to be consumed in amounts within these ratios.

The temperature range in which the sulfurization reaction is carried out is generally about 50° C.-350° C. The preferred range is about 170° C.-300° C., with about 175° C.-225° C. being especially suitable. At the "low" temperatures, generally below about 140° C. sulfurization reaction generally favors formation of polysulfides and not the preferred dithiones. The reaction can be conducted under atmospheric pressure or at elevated pressures. Elevated pressures can be by autogenous pressure (i.e., the pressure which naturally develops during the course of the reaction) but may also be externally applied pressure. The exact pressure developed during the reaction is dependent upon such factors as the design and operation of the system, the reaction temperature, and the vapor pressure of the reactants and products and it may vary during the course of the reaction. Preferred process pressures are at atmospheric to about 500 psig. In a preferred aspect, hydrogen sulfide liberated in the reaction is neutralized or removed, such as via a scrubber or other suitable means. The presence of hydrogen sulfide can reduce the yield of the desired polyisobutyl-1,2-dithiole-4-cyclopentene-3-thione compositions by forming side reactions with the HR PIB, sulfur and mercaptan products. In such instance excess HR PIB can be employed.

It is frequently advantageous to incorporate materials useful as sulfurization catalysts in the reaction mixture. Typically these are acidic (such as sulfonic acid, boric acid) or basic materials (such as inorganic oxides and salts such as sodium hydroxide, calcium oxide and sodium sulfide); with the most desirable being nitrogen bases including ammonia and amines. The amines include primary, secondary and tertiary hydrocarbyl amines wherein the hydrocarbyl radicals are alkyl, aryl, aralkyl, alkaryl or the like and contain about 1-20 carbon atoms. Suitable amines include aniline, benzylamine, dibenzylamine, dodecylamine, naphthylamine, tallow amines, N-ethyldipropylamine, N-phenylbenzylamine, N,N-diethylbutylamine, m-toluidine and 2,3-xylidine. Also useful are heterocyclic amines such as pyrrolidine, N,N-methylpyrrolidine, piperidine, pyridine and quinoline. The preferred basic catalysts include ammonia and primary, secondary, or tertiary alkylamines having about 1-8 carbon atoms in the alkyl radicals. Representative amines of this type are methylamine, dimethylamine, trimethylamine, ethylamine, diethylamine, triethylamine, di-n-butylamine, tri-n-butylamine, tri-sec-hexylamine and tri-n-octylamine. Mixtures of these amines can be used, as well as mixtures of ammonia and amines. It is also believed that addition of the desired polyisobutyl-1,2-dithiole-4-cyclopentene-3-thione product to the reaction mixture may act as a catalyst.

The amount of catalytic material used is generally about 0.05-2.0% of the weight of the HR PIB compound. In the case of the preferred ammonia and amine catalysts, about 0.0005-0.5 mole per mole of olefin is preferred, and about 0.001-0.1 mole is especially desirable.

Also present in the reaction mixture may be water, either as a catalyst or as a diluent for one or more of the catalysts recited hereinabove. The amount of water, when present, is usually about 1-25% by weight of the HR PIB compound. The presence of water is, however, not essential and when certain types of reaction equipment are used it may be advantageous to conduct the reaction under substantially anhydrous conditions.

The method of this invention is usually carried out in the absence of solvents and diluents other than water. However, it may sometimes be desirable to use a substantially inert, normally liquid organic diluent in the reaction. The nature of suitable diluents will readily be apparent to those skilled in the art.

The time required for the reaction to be completed will vary depending on the reagents, ratios thereof, the reaction temperature, the presence or absence of catalysts, and the purity of the reagents. The course of the reaction is conveniently followed by monitoring the pressure in the reaction vessel; the reaction can be considered complete when the pressure levels off to a constant value.

Following the preparation of the sulfurized mixture by the procedure described hereinabove, substantially all low boiling materials are removed. The nature of these low boiling materials will vary according to the amount and type of reactants used and the reaction conditions. It will also vary to some extent according to the use to which the sulfurized product is to be put, as well as such things as odor and flammability considerations, recycling needs of reactants and by-products, and the like. Most often, the product should have a flash point above about 30° C., preferably above 70° C. and desirably above about 100° C. as determined by ASTM Procedure D93. Reference is also made to ASTM Procedures D56 and D1310.

In addition to starting materials such as the HR PIB compound(s), the low boiling materials will often include unreacted starting materials and solids which can be removed. In addition, mercaptans and monosulfides, especially when the starting olefin contains less than 9 carbon atoms, and under those circumstances it is preferred that the product contain no more than about 5% by weight of such starting materials, mercaptan and monosulfides. If these materials are gaseous at ambient pressure and temperature, they may be removed in part simply by venting the reaction vessel, and they may be recycled if desired. In the case of less volatile starting materials, it may be necessary to resort to such techniques as distillation at atmospheric pressure or vacuum distillation or stripping. Another useful method is the passage of an inert gas such as nitrogen through the mixture at a suitable temperature and pressure. Large scale gas chromatography and molecular distillation may also be useful.

Any solids present in the reaction mixture may be conveniently removed, in most instances, by decanting the liquid product. If further removal of solids is desired, such conventional techniques as filtration or centrifugation may be used.

A further optional step in the method of this invention is the treatment of the sulfurized product, obtained as described hereinabove, to reduce active sulfur. By "active sulfur" is meant sulfur in a form which can cause staining of copper and similar materials. Standard tests are available to determine sulfur activity. As an alternative to the treatment to reduce active sulfur, metal deactivators can be used in the lubricants containing the sulfurized compositions of this invention. In some instances, such as in metal working lubricants, high levels of active sulfur may be desired and it may then be preferred not to reduce active sulfur.

When active sulfur is to be reduced, any of several methods known in the art may be employed. An illustrative method is treatment with an alkali-metal sulfide as described in U.S. Pat. No. 3,498,915.

Specific fractions of the polyisobutyl-1,2-dithiole-4-cyclopentene-3-thiones can further separated into more pure components through various techniques. For example, distillation of the mixture can lead to various purities of the fractions. Also, if lower boiling point components such as the $C_8H_{16}$ isomers are desired to be removed the reaction can be carried out under atmospheric conditions using reflux to have a $C_8$ fraction and a $C_{12-32}$ fraction. These fractions can be further purified into predominately $C_{12}$, $C_{16}$, $C_{20}$, $C_{24}$, $C_{28}$, or $C_{32}$ fractions or mixtures thereof, including mixtures with $C_8$ prior to the sulfurization reaction or subsequent thereto. Preferably the various polyisobutyl-1,2-dithiole-4-cyclopentene-3-thione isomers are enriched to be at least 10 wt. % and more preferably at least 30 wt. % and most preferably at least 50 wt. % of the total composition. Under certain circumstances substantially purified isomers can be obtained.

Other optional treatments may be employed to improve such qualities as the odor, color and staining characteristics of the sulfurized compositions. These may include treatment with acidic clays such as Super Filtrol and filtration through fuller's earth, activated charcoal, alumina clays or the like.

Such treatments are often not required when a basic catalyst is employed.

If desired, the polyisobutyl-1,2-dithiole-4-cyclopentene-3-thione compositions can oxidized with a peroxidic compound to for the resulting polyisobutenyl-1,2-dithiole-3-one composition(s). The thiocarbonyl group can be readily converted to a carbonyl group by treatment with aqueous potassium permanganate, or aqueous mercuric acetate, or by chlorination followed by hydrolysis.

Lubricating Compositions

The lubricating oil compositions of the present invention can be conveniently prepared by simply blending or mixing the composition prepared by sulfurization of a highly reactive polyisobutylene having at least 25% of a methylvinylidene isomer and wherein the polyisobutylene has a number average molecular weight in the range of about 120 to about 600 with a sulfur source at a reaction temperature in excess of about 175° C. with an oil of lubricating viscosity (base oil). The oil of lubricating viscosity may be mixed with the resulting polyisobutyl-1,2-dithiole-4-cyclopentene-3-thione compositions of the present invention, typified by Formula I. The compounds of the invention may also be preblended as a concentrate or package with various other additives in the appropriate ratios to facilitate blending of a lubricating composition containing the desired concentration of additives. The compounds of the present invention are blended with base oil a concentration at which they provide wear protection and are both soluble in the oil and compatible with other additives in the desired finished lubricating oil. Compatibility in this instance generally means that the present compounds as well as being oil soluble in the applicable treat rate also do not cause other additives to precipitate under normal conditions. Suitable oil solubility/compatibility ranges for a given compound of lubricating oil formulation can be determined by those having ordinary skill in the art using routine solubility testing procedures. For example, precipitation from a formulated lubricating oil composition at ambient conditions (about 20° C.-25° C.) can be measured by either actual precipitation from the oil composition or the formulation of a "cloudy" solution which evidences formation of insoluble wax particles.

If an engine oil formulation is desired, typically the lubricating oil composition of the invention contains about from 0.01 to 5 wt. %, preferably 0.05 to 3 wt. %, more preferably about from 0.05 to 1 wt. % based on the total weight of the composition, of a wear protectant selected from the lubricating oil soluble sulfurized compounds prepared by reacting a polyisobutylene having a number average molecular weight in the range of about 120 to about 600 with a sulfur source at a reaction temperature in excess of 175° C. Especially preferred are components of formula I, derivatives, and mixtures thereof. More preferably, the lubricating composition contains about from 0.1 to 1 wt. % of said wear protectant. The present compounds are compatible with, and can be advantageously used with, zinc dithiophosphates to increase wear protection or more preferably to reduce the amount of zinc dithiosphosphate which would otherwise be requested to provide a given level of wear protection. If a gear oil formulation is desired, typically the lubricating oil composition of the invention contains about from 0.01 to 10 wt. %, preferably 0.5 to 8 wt. %, more preferably about from 1 to 5 wt. %, and even more preferably from about from 2 to 4 wt. %, of the sulfurized reaction product of this invention and even more preferably the compounds of formula I, based on the total weight of the composition.

The lubricating oil, or base oil, used in the lubricating oil compositions of the present invention are generally tailored to the specific use e.g. engine oil, gear oil, industrial oil, cutting oil, etc. For example, where desired as an engine oil, the base oil typically will be a mineral oil or synthetic oil of viscosity suitable for use in the crankcase of an internal combustion engine such as gasoline engines and diesel engines which include marine engines. Crankcase lubricating oils ordinarily have a viscosity of about 1300 cSt at 0° F. to 24 cSt at 210° F. (99° C.) the lubricating oils may be derived from synthetic or natural sources. Mineral oil for use as the base oil in this invention includes paraffinic, naphthenic and other oils that are ordinarily used in lubricating oil compositions. Synthetic oils include both hydrocarbon synthetic oils and synthetic esters. Useful synthetic hydrocarbon oils include liquid polymers of alpha olefins having the proper viscosity. Especially useful are the hydrogenerated liquid oligomers of $C_6$ to $C_{12}$ alpha olefins such as 1-decene trimer. Likewise, alkyl benzenes of proper viscosity such as didodecyl benzene can be used. Useful synthetic esters include the esters of both monocarboxylic acid and polycarboxylic acids as well as monohydroxy alkanols and polyols. Typical examples are didodecyl adipate, pentaerythritol tetracaproate, di-2-ethylhexyl adipate, dilaurylsebacate and the like. Complex esters prepared from mixtures of mono and dicarboxylic acid and mono and dihydroxy alkanols can also be used. Blends of various mineral oils, synthetic oils and minerals and synthetic oils may also be advantageous, for example to provide a given viscosity or viscosity range. In general the base oils or base oil mixtures for engine oil are preselected so that the final lubricating oil, containing the various additives, including the present wear protectant, has a viscosity at 100° C. of 4 to 22 centistokes, preferably 10 to 17 centistokes and more preferably 13 to 17 centistokes.

Typically the lubricating oil composition will contain a variety of compatible additives desired to impart various properties to the finished lubricating oil composition depending on the particular end use and base oils used. Such additives include neutral and basic detergents such as natural and overbased organic sulfonates and normal and overbased phenates and salicylates, dispersants, ashless dispersants such as various polyalkylsuccinimides or polyalkylsuccimic acid esters, rust inhibitors, foam inhibitors, pour point dispersants, antioxidants, including the so called viscosity index (VI) improvers, dispersant VI improvers and, as noted above, other corrosion or wear inhibitors including oxidation inhibitors such as phenol compounds and amine compounds; defoaming agents such as dimethylpolysiloxane and polyacrylate; friction modifiers such as higher fatty acids, higher alcohols, aliphatic amines, fatty acid amides, esters of fatty acids, sulfurized fats, acidic phosphate esters, acidic phosphite esters, organic molybdenum compounds, and solid lubricants; corrosion inhibitors such as benzotriazole and thiazole; viscosity index improvers (which may be active type having increased dispersability) such as acrylic polymer, methacrylic polymer and olefin copolymer; and pour point depressants such as acrylic polymer, methacrylic polymer, polybutene, polyalkylstyrene and polyvinylacetate. Some of these additives are further described below.

Suitable oil soluble phosphorous containing agents include esters prepared from phosphorous acid and aliphatic or aromatic alcohols (dilauryl phosphate, diphenyl phosphate, dioleyl phosphate, mono & dibutyl phosphate) and esters prepared from phosphoric acid and aliphatic or aromatic alcohols (monooctyl phosphate, dioctyl phosphate, trioctyl phosphate, etc.). Dimethyl esters of aliphatic phosphonic acids in which the aliphatic group has an average in the range of about 12 to about 24 carbon atoms are fully described in U.S. Pat. No. 4,158,633. The aliphatic group can be saturated or unsaturated, and branched or straight chain in structure. Preferred are the dimethyl esters of aliphatic phosphonic acids wherein the aliphatic group has an average in the range of about 16 to about 20 carbon atoms. Most preferred are the phosphonate esters wherein the aliphatic group is relatively pure and contains about 18 carbon atoms or a mixture of phosphonate esters in which the aliphatic groups contain an average of about 18 carbon atoms, such as mixture derived from commercial technical grades of oleyl chloride.

Typical metal-free phosphorus-containing antiwear and/or extreme pressure additives used in the practice of this invention include esters of phosphorus acids, amine salts of phosphorus acids and phosphorus acid-esters. Examples of suitable compounds which may be used as phosphorus-containing antiwear and/or extreme pressure agents include trihydrocarbyl phosphites, phosphonates and phosphates, and dihydrocarbyl phosphites; such as tricresyl phosphate, cresyl diphenyl phosphate, tributyl phosphate, trioleyl phosphate, trilauryl phosphate, tributyl phosphite, trioctyl phosphite, triphenyl phosphite, tricresyl phosphite, tricyclohexyl phosphite, dibutyl lauryl phosphonate, dibutyl hydrogen phosphite, dioleyl hydrogen phosphite, and tolyl phosphinic acid dipropyl ester. Among the amine salts which can be employed are amine salts of partially esterified phosphoric, phosphorous, phosphonic, and phosphinic acids; amine salts of phosphonic acids and the like. Specific examples include the dihexylammonium salt of dodecylphosphoric acid, the diethyl hexyl ammonium salt of dioctyl dithiophosphoric acid, the octadecylammonium salt of dibutyl phosphoric acid, the dilaurylammonium salt of 2-ethylhexylphosphoric acid, the dioleyl ammonium salt of butane phosphonic acid, and analogous compounds.

The ester, amide or amine salt portion of the dithiophosphate will generally have from 1 to 20 carbons, preferably 4 to 10 carbons, and from 0 to 5 nitrogens (when the amide or amine salt is employed, that portion preferably has from 1 to 3 nitrogens with the carbon to nitrogen atomic ratio preferably ranging from 1 to 10). The ester, amide or amide salt portion of the dihydrocarbyl dithiophosphate antiwear agent will contain stable organic moieties such as hydrocarbon or ethoxylated hydrocarbon groups.

Exemplary dihydrocarbyl dithiophosphate amides include the ethyl amide of di-4-methyl-2-pentyl dithiophosphate, the butyl amide of diisoctyl dithiophosphate, the aminoethyl amide of ditetrapropenylphenyl dithiophosphate, the diamino diethylene amide of ditetrapropenylphenyl dithiophosphate, and diamino diethylene amide of di-2-ethyl-1-hexyl dithiophosphate.

Metal containing phosphorus compounds are formed by reacting a dihydrocarbyl dithiophosphoric acid with a metal oxide, for example zinc oxide, The hydrocarbyl portion of the dithiophosphoric acid will usually have from 4 to 20 carbons, preferably from 5 to 12 carbons, and more preferably from 6 to 8 carbons. As referred to herein, the term "hydrocarbyl" represents a monovalent organic radical composed essentially of hydrogen and carbon, but minor amounts of inert substituents may be present. The hydrocarbyl may be aliphatic, aromatic or alicyclic or combinations thereof, for example, aralkyl, alkyl, aryl, cycloalkyl, alkylcycloalkyl, etc., and may be saturated or olefinically unsaturated. Exemplary hydrocarbyl groups include methyl, ethyl, propyl, butyl, pentyl, 4-methylpentyl, 2-ethylhexyl, hexyl, octyl, isooctyl, stearyl, phenyl, benzyl, ethylbenzyl, amyl, propenylphenyl, dipropenylphenyl, tetrapropenylphenyl, tolyl, etc. The primary, secondary or tertiary hydrocarbyl groups may be employed, but the branched-chain, primary groups are preferred, even more preferred are mixtures of aliphatic groups and in a preferred embodiment, at least 75 mole percent of sec-butyl alcohol is used and preferably combined with 4-methyl-2-pentanol, and most preferably further combined with a zinc metal. Particularly preferred metal dihydrocarbyl phosphorodithioates include the zinc dithiophosphates. Patents describing the synthesis of such zinc dithio-phosphates include U.S. Pat. Nos. 2,680,123; 3,000,822; 3,151,075; 3,385,791; 4,377,527; 4,495,075 and 4,778,906. Each of these patents is incorporated herein by reference in their entirety.

Exemplary zinc dihydrocarbyl dithiophosphates include zinc di-n-octyl dithiophosphate, zinc butyl isooctyl dithiophosphate, zinc di-4-methyl-2-pentyl dithiophosphate, zinc ditetrapropenylphenyl dithiophosphate, zinc di-2-ethyl-1-hexyl dithiophosphate, zinc diisoctyl dithiophosphate, zinc dihexyl dithiophosphate, zinc diphenyl dithiophosphate, zinc diethylphenyl dithiophosphate, zinc diamyl dithiophosphate, zinc butyl phenyl dithiophosphate, zinc dioctadecyl dithiophosphate.

Alkali-metal borates or hydrates thereof are well known in the art as extreme pressure additives and are available commercially. Examples of the alkali-metal borates or hydrates thereof include potassium borate hydrate and sodium borate hydrate represented by $KB_3O_5.H_2O$ and $NaB_3O_5.H_2O$, respectively. These alkali-metal borate hydrates are, for example, prepared by the steps of dissolving potassium (or sodium) hydroxide and boric acid in water so that the atomic ratio of boron to alkali-metal (potassium or sodium) would be in the range of 2.0 to 4.5 (boron/alkali-metal), dispersing the solution in an oily solution containing a neutral alkaline earth metal sulfonate or an ashless dispersant of succinic imide type, and allowing it to react to obtain the desired hydrate in the form of a dispersion liquid of fine particles. The gear lubricating oil composition of the invention comprises the alkali-metal borate or hydrate thereof in an amount of 0.04 to 1.0 wt. % in terms of boron content, preferably 0.05 to 0.6 wt. %, more preferably 0.08 to 0.5 wt %. This amount corresponds to about 0.6 to 15 wt. % of alkali-metal borate or hydrate thereof in the lubricating oil composition, if OLOA9750 (dispersion liquid of potassium borate hydrate, commercially available from Chevron Oronite Company LLC, Houston Tex., boron content: 6.8 wt. %) is employed as the alkali-metal borate.

One type of copper corrosion inhibitors which can be used in the practice of this invention is comprised of thiazoles, triazoles and thiadiazoles. Examples include benzotriazole, tolyltriazole, octyltriazole, decyltriazole, dodecyltriazole, 2-mercap-tobenzothiazole, 2,5-dimercapto-1,3,4-thiadiazole, 2-mercapto-5-hydrocarbylthio-1,3,4-thiadiazoles, 2-mercapto-5-hydrocarbyldithio-1,3,4-thiadiazoles, 2,5-bis (hydrocarbylthio)-1,3,4-thiadiazoles, and 2,5-bis(hydrocarbyldithio)-1,3,4-thiadiazoles. The preferred compounds are the 1,3,4-thiadiazoles, especially the 2-hydrocarbyldithio-5-mercapto-1,3,4-dithiadiazoles and the 2,5-bis(hydrocarbyldithio)-1,3,4-thiadiazoles, a number of which are commercially available. Other suitable inhibitors of copper corrosion include ether amines; polyethoxylated compounds such as ethoxylated amines, ethoxylated phenols, and ethoxylated alcohols; imidazolines; and the like.

Suitable antifoam agents for use in the compositions of this invention include silicones and organic polymers such as acrylate polymers. Mixtures of silicone-type antifoam agents such as the liquid dialkyl silicone polymers with various other substances are also effective. Typical of such mixtures are silicones mixed with an acrylate polymer, silicones mixed with one or more amines, and silicones mixed with one or more amine carboxylates. Other such mixtures include combinations of a dimethyl silicone oil with (i) a partial fatty acid ester of a polyhydric alcohol (U.S. Pat. No. 3,235,498); (ii) an alkoxylated partial fatty acid ester of a polyhydric alcohol (U.S. Pat. No. 3,235,499); (iii) a polyalkoxylated aliphatic amine (U.S. Pat. No. 3,235,501); and (iv) an alkoxylated aliphatic acid (U.S. Pat. No. 3,235,502).

The formulations may also contain a rust inhibitor. This may be a single compound or a mixture of compounds having the property of inhibiting corrosion of ferrous metal surfaces. Such materials include oil-soluble monocarboxylic acids such as 2-ethylhexanoic acid, lauric acid, myristic acid, palmitic acid, oleic acid, linoleic acid, linolenic acid, behenic acid, cerotic acid, etc., and oil-soluble polycarboxylic acids including dimer and trimer acids, such as are produced from tall oil fatty acids, oleic acid, linoleic acid, or the like. Other suitable corrosion inhibitors include alkenylsuccinic acids in which the alkenyl group contains 10 or more carbon atoms such as, for example, tetrapropenylsuccinic acid, tetradecenylsuccinic acid, hexadecenylsuccinic acid, and the like; long-chain alpha-omega-dicarboxylic acids in the molecular weight range of 600 to 3000; and other similar materials.

When lubricating compositions contain on or more of the above mentioned additives, each additive is typically blended into the base oil in an amount which enables the additive to provide its desired function. Representative effective amounts listed as mass percent active ingredients when used as an engine oil and preferably a crankcase lubricant are illustrated herein: ashless dispersant from 0.1 to 20 and preferably 1-8; detergent from 0.1 to 15 and preferably 0.2 to 9; metal dialkyl dithiophosphate from 0.01 to 6 and preferably 0.05 to 5 based upon phosphorous content; antioxidant from 0 to 5 and preferably 0.01 to 1.5; pour point depressant from 0.01 to 5 and preferably 0.01 to 1.5; antifoaming agent from 0 to 5 and preferably 0.001 to 0.15; supplemental antiwear agents from 0 to 0.5 preferably 0 to 0.2; friction modifier form 0 to 3 and preferably 0 to 1; viscosity modifier from 0 to 6 and preferably 0.01 to 4. Additionally, these additives may be added to a gear oil formulation in the ranges depicted above. However, preferably a gear lubricating composition comprises: a major amount of oil of lubricating viscosity; 0.01 to 10 wt. % preferably 0.5 to 8.0 wt. % in terms of sulfur content of a sulfurized olefin prepared by reacting a polyisobutylene having at least 25% of a methylvinylidene isomer and wherein the polyisobutylene has a number average molecular weight in the range of about 120 to about 600 with a sulfur source at a reaction temperature in excess of 175° C.; 0.05 to 5.0 wt. % in terms of phosphorous content of at least one oil soluble phosphorous containing compound selected from extreme pressure agents and antiwear agents; 0.04 to 1.0 wt. % in terms of boron content of an alkali-metal borate or hydrate thereof. Additionally such gear lubricating further comprises at least one of the following additional components: 0.1 to 5 wt. % based upon the weight of said lubrication composition of at least one ashless dispersant; 0.1 to 0.8 wt. % based upon the weight of said lubrication composition of at least one copper corrosion inhibitor; 0.01 to 0.1 wt. % based upon the weight of said lubrication composition of at least one foam inhibitor; and, 0.01 to 0.1 wt. % % based upon the weight of said lubrication composition of at least one antirust agent.

The present lubricating compositions also include greases containing the present oil such as the base oils described above as well as more viscous mineral, natural, or synthetic oils and a thickening agent to provide the desired consistency to the grease. The base oil is generally used in an amount sufficient to balance the total grease composition, after accounting for the desired quantity of the thickening agent, and other additive components including in the grease formulation. A wide variety of materials can be employed as thickening or gelling agents. These can include fatty acid metal salts or soaps, such as calcium, or lithium stearates or hydroxystearates, which are dispersed in the lubricating vehicle in grease-forming quantities in an amount sufficient to impart to the resulting grease composition the desired consistency. Other thickening agents that can be employed in the grease formulation comprise the non-soap thickeners, such as surface-modified clays and silicas, aryl ureas, calcium complexes and similar materials. In general, grease thickeners can be employed which do not melt or dissolve when used at the required temperature within a particular environment; however, in all other respects, any material which is normally employed for thickening or gelling hydrocarbon fluids for forming greases can be used in the present invention.

The present invention also provides an additive package or concentrate which may be added to an oil of lubricating viscosity either as the sole additive or in combination with other additives. (Generally, the additive package will not contain a viscosity index improver because even where desired the viscosity index improver is generally added to the base oil by the lubricant formulator.) Thus, a preferred additive concentrate contains about from 0.5 to 50 wt. % more preferably 1 to 40 wt. % of the sulfurized polyisobutylene reaction product and compound of formula I of the present invention and sufficient basic material (typically overbased detergents) to provide the concentrate with a TBN of about from 60 to 180 preferably 60 to 120; and about 1 to 10 wt. % preferably 2 to 6 wt. % of a diluent oil or other compatible inert organic liquid diluent. With the general exception of the VI improver, the concentrate will frequently also contain various other additives considered desirable from the intended use and generally will contain about from 30 to 60 wt. % of an ashless dispersant and frequently will also contain neutral or slightly alkaline detergent in addition to the overbased detergent. The amount of overbased detergent needed to provide the requisite TBN will, of course, vary with the TBN of the overbased detergent but typically will be 20 to 80 wt. % of the concentrate. The concentrate may also be provided as an individual concentrate containing about from 85 to 95 wt. % of the present sulfurized reaction product or compound of formula I and about 5 to 15 wt. % of an inert organic liquid diluent designed for formulation either into an additives package or directly into the base oil. Additive packages or concentrates may also be provided for greases, though generally such packages will contain little more than the compounds of the present invention and perhaps other antiwear or extreme pressure agents.

Included in the lubricating oil compositions of the present invention are engine oils such as diesel engine oils, as noted above, including those used in marine diesel engines, locomotives, power plants and high speed automotive diesel engines, gasoline burning engines and compressors; functional fluids including automotive fluids such as automatic transmission fluids, power steering fluids and power brake fluids; gear oils including such oils are automotive spiral-bevel and worm-gear axle oils which operate under extreme pressures, load and temperature conditions, hypoid gear oils operating under both high speed, low torque and low speed, high torque conditions and various other industrial oils and cutting oils.

The various additive materials or classes of materials described above are known materials and can be prepared by known procedures or obvious modifications thereof and frequently are readily available from commercial sources. A listing of various additives and their function is for example described in columns 9 and 10 of U.S. Pat. No. 4,119,549 and U.S. Pat. No. 5,397,486, hereby incorporated by reference.

EXAMPLES

The following examples are included to demonstrate preferred embodiments of the invention. It should be appreciated by those of skill in the art that the techniques disclosed in the examples that follow may represent techniques discovered by the inventor to function well in the practice of the invention, and thus may be considered to constitute preferred modes for its practice. However, those of skill in the art should, in light of the present disclosure, appreciate that many changes may be made in the specific embodiments that are disclosed and still obtain a like or similar result without departing from the spirit and scope of the invention.

Comparative Example A

Preparation of Sulfurized Isobutylene

Saturated dialkyl polysulfides from reacting isobutylene with hydrogen sulfide and elemental sulfur can be represented by the following reaction scheme:

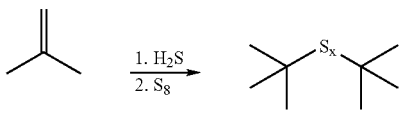

Typically these compounds are prepared via a two step process where t-butyl mercaptan is generated in the first step, followed by sulfurization to yield di-t-butyl polysulfides. By carefully controlling reaction conditions mixtures and predominately separated fractions of di-sulfides, tri-sulfides and tetra-sulfide di-t-butyl polysulfide compounds can be formed. These reaction products were characterized by GCMS; four major products were detected. These products are evidenced in the gas chromatogram by four major peaks with increasing retention times corresponding to the di-, tri-, tetra-, and penta-sulfides respectively. The compounds were characterized by the mass spectra; for each compound, a molecular ion is present (i.e. 178, 210, 242, and 274 m/z for the sulfides listed), and a base peak at 57 m/z attributed to the t-butyl fragment ion. These compounds are commercially available, for example $C_8H_{18}S_x$ where x averages 3 and 4 are available as TBPS 344 and TBPS 454, respectively, from Chevron Phillips Chemical Company LP, Houston Tex. The latter was used herein as Comparative Example A.

Comparative Example B

Preparation of Sulfurized Isobutylene Complex Mixtures

More complex alkyl-alkenyl type polysulfide mixtures can be formed by changing reaction conditions, temperature reactant charging or by employing a catalyst. The alkyl-alkenyl products formed are presented by the following scheme:

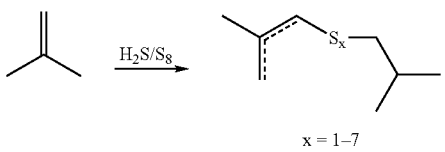

x = 1–7

These reaction products contain a mixture of alkyl-alkenyl type polysulfide products with alkyl/alkenyl disulfide and alkyl/alkenyl trisulfide as predominate components. The mixtures also contain cyclic trisulfides, dialkenyl sulfides and disulfides, alkyl/dialkenyl di- and trisulfides as well as other sulfides. These products were also characterized by GCMS. The following table outlines the structures, identified from the mass spectra, for the majority of the compounds detected in a typical sample; included are the mass/charge ratios of the molecular ions observed, and the concentrations for a typical sample.

TABLE 1

Sulfurized isobutylene complex mixtures

| Sulfide Structure | Molecular Ion, m/z | Weight % |
|---|---|---|
| $C_8H_{12}S$ Mol. Wt.: 140 | 140 | 2-5 |
| $C_8H_{16}S_2$ Mol. Wt.: 176.34 | 176 | 15-20 |
| $C_8H_{16}S_3$ Mol. Wt.: 208.41 | 208 | 25-30 |
| $C_{12}H_{22}S_2$ Mol. Wt.: 230.43 | 230 | 1-5 |
| $C_{12}H_{22}S_3$ Mol. Wt.: 262.50 | 262 | 3-10 |

Commercially available products are sold as Vanlube SB, Vanderbilt Company Inc., Norwalk Conn. and Mobilad C-100, ExxonMobil Chemical Company of which the latter was used herein as Comparative Example B.

Comparative Example C

Sulfurization of Commercially Available Triisobutylene

A typical commercially available triisobutylene (TCI America) having less than 2% methylvinylidene, contained about 45% 2,2,6,6-tetramethyl-4-methylene heptane and about 53% 2,2,4,6,6-pentamethyl-3-heptene was treated 2.5 mole equivalents of sulfur. 362.9 g (2.16 mol) of the triisobutylene and 173 g (5.4 mol) of sulfur were reacted under conditions similar to those described in example 2. After about 6 hours at about 180° C. (reflux), the yield of sulfurized products was 4% which included less than 1% of 4,5-dialkyl-1,2-dithiole-4-cyclopentene-3-thione by GCMS. The alkyl groups on the dithiolethione were t-butyl and neopentyl as evidenced in the mass spectrum which included the molecular ion, 260 m/z, and fragment ions 57, 189, 203, 227, and 245 m/z.

Preparation of Sulfurized Polyisobutylene Oligomers of the Invention

Example 1

Preparation of polyisobutyl-1,2-dithiole-4-cyclopentene-3-thione "PDCT" Mixtures from a High Methyl Vinylidine $C_8$-$C_{32}$ Polyisobutene Fraction.

1904.8 g (10.7 mol) of a high methyl vinylidine content low molecular weight PIB having a number average molecular weight of 178, approximately 74% methyl vinylidene content (and a weight fraction of each oligomer of approximately 16 wt. % $C_8H_{16}$, about 41 wt. % $C_{12}H_{24}$, about 26 wt. % $C_{16}H_{32}$, about 11 wt. % $C_{20}H_{40}$, about 4 wt. % $C_{24}H_{48}$, and about 2 wt. % $C_{28}H_{56}$ with trace amounts of $C_{32}H_{64}$ as characterized by gas chromatography and nuclear magnetic resonance spectroscopy) and 1017.5 g of elemental sulfur were charged to a 5 liter stainless steel autoclave. The autoclave was flushed with nitrogen, and then sealed. The reactants were stirred and heated to 200° C. over about 2 hours. The temperature was then maintained between 200 and 220° C. under autogenous pressure for 3.5 hours such that the pressure in the autoclave did not exceed 200 psia. The reaction was cooled to ambient temperature and the autoclave was vented through a caustic scrubber. 2440 g of a dark red oil was diluted with pentane, filtered, and then stripped to remove solvent. Product contained 29.3% sulfur, as analyzed with a LECO SC-32 sulfur analyzer by ASTM D1552, and 49.5% of the PDCT's of formula I as characterized by GCMS.

Example 2

Preparation of PDCT Mixtures from a High Methyl Vinylidine $C_{12}$-$C_{32}$ Polyisobutene Fraction:

497.4 g (2.51 mol) of a low molecular weight polybutene that had been distilled to remove the $C_8$ isomers, having a number average molecular weight of 198 and 73% methyl vinylidene content, and 201 g of sulfur were heated and stirred, under a nitrogen atmosphere, in a 3 neck glass round bottom flask equipped with a mechanical stirrer, heat mantle, thermocouple, temperature controller, reflux condenser, nitrogen inlet, and caustic scrubber. A gentle sweep of nitrogen was continuously passed through the vessel and scrubber. The reactants were heated to reflux, at about 180° C., then slowly heated to 200° C. over a total of about 1 hour; they were held at 200° C. for about 20 minutes, then heated at 220° C. for 2.5 hours. After cooling to room temperature the product was diluted with 400 ml of heptane and filtered through diatomaceous earth. The solvent was removed to yield 447.4 g of a dark red, viscous oil that contained 23.8% sulfur.

Example 3

Preparation of PDCT from Isobutene Tetramer

A distillation fraction containing $C_{16}$ isomers, that included about 66 wt % methylvinylidene, from polyisobutene was sulfurized in a manner similar to example 2. The products of this Example were characterized by gas chromatography mass spectroscopy (GCMS) analysis. The following table contains molecular structures or empirical formulas, mass charge ratios for molecular ions observed, and weight percent of the majority of the composition.

TABLE 2

| Sulfurized reaction product from high methyl-vinylidene isobutene tetramer | | |
|---|---|---|
| Sulfide | Molecular Ion, m/z | Weight % |
| $C_{16}H_{28}S$ | 252 | 1.2 |
| $C_{16}H_{32}S_2$ | 288 | 1.5 |
| $C_{16}H_{28}S_2$ | 284 | 3.2 |
| (structure shown) n = 0, 1; $R_1$ = H, $CH_3$ | 316 | 38.3 |
| $(C_{16}H_{33})_2S_2$ | 514 | 15.4 |
| $(C_{16}H_{33})_2S_3$ | 546 | 3.1 |

The polyisobutyl-1,2-dithiole-4-cyclopentene-3-thiones, wherein n is zero $R_1$ is methyl and n is one $R_1$ is hydrogen; are the major products and account for about 40% of the product by weight; the mass spectrum of this compound exhibits a molecular ion at 316 m/z with a $^{34}S$ isotope peak (m+2 peak) corresponding to three sulfur atoms per molecule and fragment ions at 41, 57, 148, 189 and 203 m/z. Characteristic of the PDCT's is an intense 1481 m/z fragment ion peak. The di-tetraisobutyl-polysulfides are the second most abundant compound type present in the mixture; the mass spectrum for the disulfide exhibited the molecular ion at 514 m/z with the $^{34}S$ isotope peak corresponding two sulfur atoms per molecule, and fragment ions at 41, 57, 69, 97, 113, and 129 m/z. It is anticipated that the yield of PDCT's could be increased. The compounds of this invention may be purified, for example by distillation or chromatography.

Example 4

Purification of polyisobutyl-1,2-dithiole-4-cyclopentene-3-thiones (PDCT's of Example 1):

A sample from Example 1 was purified by HPLC on a silica gel column. The column was flushed with hexane to remove unreacted HR PIB and sulfur containing compounds other than PDCT's. Fractions containing the desired dithiolethiones were collected using hexane:ethyl acetate 9:1 as eluent. Removal of solvent from a set of fractions yielded a product that contained 88.4 weight percent of $C_{8, 12, 16, 20}$ PDCT's by GC; the product contained about 33% sulfur.

Performance Examples

The following examples tested the antiwear properties, extreme pressure properties and oxidation properties. The base line formulation employed a formulated oil. This formulated oil comprised a lubricating oil and additives in their typical amounts for particular purpose; this included a Group II base oil of a viscosity grade of 5W20, 3 wt. % of a 2300 molecular weight post treated ethylene carbonate bissuccinimide dispersant, 1 wt. % of a low overbase TBN 17 calcium sulfonate, 2.4wt. % of a high overbase TBN 250 calcium phenate, 0.6 wt % of a secondary alcohol ZnDTP, 0.5 wt. % of a diphenyl amine antioxidant, and a viscosity index improver.

This formulation is referred to herein as a low phosphorous basestock since the phosphorous content is approximately 0.08 wt. % on the basis of total phosphorous in the lubricating composition.

Example 5

Anti-Wear Properties

Four Ball Wear Test

The Four Ball Wear Test was preformed in a manner similar to ASTM D-4172 (4-ball wear), as described below. Samples of the polyisobutyl-1,2-dithiole-4-cyclopentene-3-thione compounds prepared according to Example 1, Example 3, and a commercially available sulfurized isobutylene (Comparative Example A), were top-treated to the baseline low phosphorus automotive crankcase engine oil at a treat rate of 0.2 to 0.25 weight percent to the above formulation according to the following table. These formulated test oils were aged in an oxidation bath, containing steel ball bearings, for 48 hours at 160° C. with 15 L/hour of airflow bubbled through the oil. These aged oils were tested on a 4-ball wear test apparatus using 100 C6 steel balls; 90 kg load was applied in 9 stages starting from 10 kg with 10 kg increments at 1500 rotations per minute. The wear index was calculated from movement of the load arm.

Table 3 shows the wear test results. The products of Example 1 and Example 3 were both more effective at controlling wear than the baseline formulation alone or the baseline with Comparative Example A which in contrast, gave performance worse than the baseline. The product of Example 1 gave significantly better performance compared to the baseline.

TABLE 3

Wear index results

| SAMPLE | Treat rate, % S basis | Wear Index |
|---|---|---|
| Basestock (base line) | 0 | 179 |
| Example 1[1] | 0.059 | 82 |
| Example 3[1] | 0.039 | 165 |
| Comparative A[1] | 0.054 | 331 |

[1]Added to basestock oil

Example 6

Extreme Pressure Properties

Falex Extreme Pressure Wear Test

The products of Example 2, Example 3, and Comparative Example A were tested on a Falex extreme pressure wear test apparatus. This test is used to evaluate the load carry capacity of an oil under high contact pressure conditions. The samples were top-treated to the basestock above at 0.20 to 0.25 weight percent treatment. These formulated test oils were not pre-aged. The Falex tests were conducted at room temperature, under 400 pounds load and rotation of the pin at 290 rotations per minute for one hour following a break-in period of 5 minutes at 250 pounds load. Test results, shown as weight loss of the pin at the end of the test, or as seizure if the parts welded prior to the end of the test, are in Table 4. The top-treatment of both the comparative example A and the product of Example 2 improved the load capacity of the baseline such that seizure did not occur.

TABLE 4

Falex Test Results

| SAMPLE | Treat rate, % S basis | Seizure (Yes/No) | Wt Loss (mg) |
|---|---|---|---|
| Basestock (baseline) | 0% | Y | n/a |
| Example 2[1] | 0.060 | N | 35 |
| Example 3[1] | 0.039 | Y | n/a |
| Comparative Example A[1] | 0.054 | N | 18.5 |

[1]Added to basestock oil

Example 7

Gear Test

The products of Examples 1, 2, and 3 and comparative Examples A and B were tested on an FZG gear test rig modified for "shock load" conditions according to the procedure described by B.-R Hohn et al in *Scuffing load capacity test in the FZG gear test rig for gear lubricants with high EP performance*, presented at the Fifth CEC International Symposium on the Performance Evaluation of Automotive Fuels and Lubricants 13-15 May, 1997, in Gotegorg Sweden. The FZG "Shock Load" Gear Test was performed to evaluate the anti-scuffing properties of the compounds of this invention. The products of Examples 1 through 3 and two commercially available sulfurized isobutylenes, Comparative Example A and Comparative Example B. The FZG Gear Test employed the additive at 0.9% sulfur in Chevron 600 neutral oil. ASTM D 5182 details the standard procedure and equipment for the FZG Load Stage test. In the shock load method, the gears were loaded in stages, starting with load stage 1, until 10 mm of a gear tooth surface are scuffed. Table 5 contains the test results, shown as the stage at which this failure occurred.

TABLE 5

FZG "shock load" gear test

| SAMPLE | TEST RESULT - Stage at which failure occurred |
|---|---|
| Example 1 | 11 |
| Example 2 | 11 |
| Example 3 | 8 |
| Comparative Example A | 11 |
| Comparative Example B | 11 |

The products of Examples 1 and 2 gave performance comparable to the commercially available sulfurized isobutylenes.

Example 8

Rear Differential Axel Test

The L-42 Rear Differential Axel test was performed to evaluate the compounds of this invention employed in gear lubricant formulations. The products of Examples 1 through 3, Comparative Examples A through B were tested for anti-scoring properties under high speed and shock conditions using DANA model 44 hypoid rear axle by the L42 method described in ASTM publication STP 512A. Test results, in Table 6, are the scored area on the pinion and ring gears and a pass/fail based on comparison to a reference oil formulation. Samples were tested at various concentrations based on sulfur content for the lowest concentration of the commercial products to pass. The pass/fail criteria requires that there be less quantity of scoring on the ring and pinion gears than on the associated pass reference oil test. To pass, Comparative Example A required a sufficient amount of additive to provide 1.1% sulfur. At this concentration of sulfur the compositions of Example 1 and Example 3 did not perform as well as the reference oil. However, it is contemplated that at concentrations of sulfur greater than 1.1 and less than 1.8 the compositions of Examples 1 and 3 would pass.

A second test was preformed using the lowest amount of a commercially available product Comparative Example B to pass this test. To pass, Comparative Example B required 1.7% sulfur. As shown from Table 6, Example 2 provided superior gear protection at 1.8% sulfur in comparison to Comparative Example B. In fact, at this concentration of additive Example 2 a quantity of Scoring Area % data is three times lower then Comparative Example B.

TABLE 6

L42 Test Results

| SAMPLE | Treat rate, % S basis | Scoring Area % Ring | Scoring Area % Pinion | Result (Pass/Fail) |
|---|---|---|---|---|
| Comparative Example A | 1.1 | 11 | 12 | Pass |
| Example 1 | 1.1 | 27 | 33 | Fail |
| Example 3 | 1.2 | 33 | 39 | Fail |
| Comparative Example B | 1.7 | 14 | 21 | Pass |
| Example 2 | 1.8 | 5 | 6 | Pass |

Example 9

Mini-Traction Machine Evaluation

The products of Example 1 and the product of Example 4 were evaluated using a PCS Instruments Ltd., London UK, Mini-Traction Machine (MTM) tribometer. The MTM tribometer was set up to run in pin on disk mode using polished disks of 52100 steel from PCS Instruments, and a 0.25 inch stationary ball bearing, also of 52100 steel from Falex corporation, in place of a pin. The test was conducted at 100° C. for 40 minutes at 7 Newtons load at a sliding speed of 200 mm/s, following a break-in period of 5 minutes at 0.1 Newtons and a sliding speed of 2000 mm/s. Test results, in Table 7, show the wear scar generated on the ball bearing as measured with an optical microscope by conventional methods. Reported are the average wear scar from 4 test runs. Tests results from a commercially available zinc dithiophosphate are included for comparison purposes. The product of Example 4 afforded superior wear protection under the conditions of this test. Product from Example 1 was tested at 3 different concentrations in Chevron 100 neutral oil; product from Example 4 was tested at equal sulfur compared to example 1 at 1.9 weight %.

TABLE 7

MTM test results

| Sample | Wt. % additive in 100 Neutral Oil | Wear Scar (µm) |
|---|---|---|
| Example 1 | 0.5 wt % | 575 |
| Example 1 | 1.0 wt. % | 478 |

TABLE 7-continued

MTM test results

| Sample | Wt. % additive in 100 Neutral Oil | Wear Scar (µm) |
|---|---|---|
| Example 1 | 1.9 wt. % | 228 |
| Example 4 | 1.9 wt. % | 156 |
| ZnDTP[2] | 1.4 wt. % | 172 |

ZnDTP[2] is a secondary alcohol zinc dithiophosphate (from sec-butanol and methylisobutylcarbinol) and employed at a concentration of approximately 0.2 wt % in terms of phosphorous.

As shown from Table 7, the product of Example 4 unexpectedly yields a superior result compared to ZnDTP in this wear test. This data suggests that ZnDTP may be replaced by a suitable amount of PDCT in low phosphorus lubricating oil formulations.

Example 10

Oxidation Test

Oxidation studies of the product from Example 2 were carried out in a bulk lube oil oxidation bench test as described by E. S. Yamaguchi et al. in *Tribology Transactions*, Vol. 42 (4), 895-901 (1999). In this test the rate of oxygen uptake by a given volume of oil, with added metal catalyst, is monitored at constant pressure and temperature, 171° C. and 2 psig $O_2$ for the test results reported in Table 8. The time required for 250 ml of oxygen uptake for a 25 g sample, and the time a which a marked increase in the rate of oxygen uptake was observed, is reported, for a baseline formulation and the baseline formulation top-treated with 0.5 weight percent of the product of Example 2, in the following table.

TABLE 8

Oxidation Test Results

| Test Parameters | Formulation | Time, Hrs |
|---|---|---|
| 250 ml $O_2$ uptake/25 g | Baseline | 17.3 |
|  | Baseline + Example 2 | 21.7 |
| Increased $O_2$ uptake | Baseline | 13.1 |
|  | Baseline + Example 2 | 28.6 |

What is claimed is:

1. A compound of Formula I:

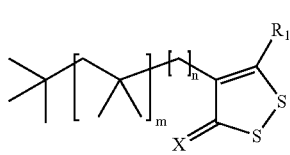

FORMULA I wherein
   $R_1$ is hydrogen;
   X is sulfur or oxygen;
   m is an integer from 1 to 5; and
   n is equal to one.
2. The compound according to claim 1 wherein X is sulfur.
3. The compound according to claim 1 wherein m is greater than one.
4. A lubricating composition comprising:
   a. an oil of lubricating viscosity; and
   b. a compound of Formula I:

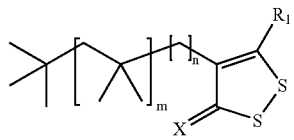

FORMULA I wherein
R₁ is hydrogen;
X is sulfur or oxygen;
m is an integer from 1 to 5; and
n is equal to one.

5. The lubricating composition according to claim 4, wherein said composition contains from about 0.01 to 10 wt % of b) based upon the total weight of the composition.

6. The lubricating composition according to claim 5, wherein said composition contains from about 0.05 to 3 wt % of b) based upon the total weight of the composition.

7. The lubricating composition according to claim 6, wherein said composition contains from about 0.05 to 1 wt % of b) based upon the total weight of the composition.

8. The lubricating composition according to claim 5, wherein said composition contains from about 0.5 to 8 wt % of b) based upon the total weight of the composition.

9. The lubricating composition according to claim 8, wherein said composition contains from about 1 to 5 wt % of b) based upon the total weight of the composition.

10. The lubricating composition according to claim 9, wherein said composition contains from about 2 to 4 wt % of b) based upon the total weight of the composition.

11. The lubricating composition according to claim 4 further comprising:
   c. an ashless dispersant;
   d. a detergent;
   e. a metal dialkyl dithiophosphate.

12. A gear lubricating composition comprising:
   a. a major amount of oil of lubricating viscosity;
   b. 0.5 to 8.0 wt. % in terms of sulfur content of a compound of Formula I:

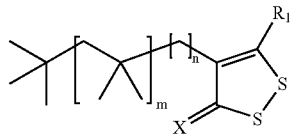

FORMULA I wherein
R₁ is hydrogen;
X is sulfur or oxygen;
m is an integer from 1 to5; and
n is equal to one;
   c. 0.05 to 5.0 wt. % in terms of phosphorous content of at least one oil soluble phosphorous containing compound selected from extreme pressure agents and antiwear agents;
   d. 0.04 to 1.0 wt. % in terms of boron content of an alkali-metal borate or hydrate thereof.

13. The gear lubricating composition according to claim 12 further comprising at least one of the following additional components:
   e. 0.1 to 5 wt. % based upon the weight of said lubrication composition of at least one ashless dispersant;
   f: 0.1 to 0.8 wt. % based upon the weight of said lubrication composition of at least one copper corrosion inhibitor;
   g. 0.01 to 0.1 wt. % based upon the weight of said lubrication composition of at least one foam inhibitor
   h. 0.01 to 0.1 wt. % % based upon the weight of said lubrication composition of at least one antitrust agent.

14. An additive concentrate comprising:
   a. from about 85 to 95 weight percent of a compound of Formula I:

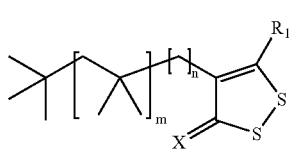

FORMULA I wherein
R₁ is hydrogen;
X is sulfur or oxygen;
m is an integer from 1 to 5; and
n is equal to one;
   b. from about 5 to 15 weight percent of an inert organic liquid diluent.

15. The additive concentrate according to claim 14 wherein X is sulfur.

16. The lubricating composition according to claim 4 wherein X is sulfur.

17. The gear lubricating composition according to claim 12 wherein X is sulfur.

* * * * *